US012363492B1

(12) United States Patent
Delikaris Manias et al.

(10) Patent No.: US 12,363,492 B1
(45) Date of Patent: Jul. 15, 2025

(54) SPATIAL AUDIO USING NEAR-FIELD AND FAR-FIELD RENDERING

(71) Applicant: Apple Inc., Cupertino, CA (US)

(72) Inventors: Symeon Delikaris Manias, Los Angeles, CA (US); Peter A. Raffensperger, Cambridge, MA (US)

(73) Assignee: Apple Inc., Cupertino, CA (US)

(*) Notice: Subject to any disclaimer, the term of this patent is extended or adjusted under 35 U.S.C. 154(b) by 253 days.

(21) Appl. No.: 18/318,598

(22) Filed: May 16, 2023

Related U.S. Application Data

(60) Provisional application No. 63/343,387, filed on May 18, 2022.

(51) Int. Cl.
*H04S 7/00* (2006.01)

(52) U.S. Cl.
CPC ............ *H04S 7/30* (2013.01); *H04S 2420/01* (2013.01)

(58) Field of Classification Search
CPC ............................... H04S 7/30; H04S 2420/01
See application file for complete search history.

(56) References Cited

U.S. PATENT DOCUMENTS 10,867,619 B1 12/2020 Kuster
11,546,687 B1 * 1/2023 Delikaris Manias ... H04S 7/304
11,765,537 B2 * 9/2023 Wang ..................... H04R 3/005 381/303
2012/0014525 A1 * 1/2012 Ko ............................ H04S 7/40 381/17
2012/0237037 A1 * 9/2012 Ninan ..................... H04S 7/304 381/17
2017/0366913 A1 * 12/2017 Stein ..................... G10L 19/008
2019/0116450 A1 * 4/2019 Tsingos ............... G10L 21/0232
2022/0059123 A1 2/2022 Sheaffer et al.
2023/0362537 A1 * 11/2023 Laitinen .................... H04S 7/30

FOREIGN PATENT DOCUMENTS

CN 105264916 B * 11/2017 ............... H04R 5/02
JP 2009036810 A * 2/2009

* cited by examiner

*Primary Examiner* — David L Ton
(74) *Attorney, Agent, or Firm* — Aikin & Gallant, LLP

(57) ABSTRACT

A device may include a plurality of microphones, and a processor configured to extract a sound and a sound field from microphone signals of the plurality of microphones. The sound may be treated as near-field sound and the sound field may be treated as far-field sound. The device may adjust a strength of the sound based on a strength of the sound field and apply near-field head related transfer functions (HRTFs) to the sound. The device may apply far-field HRTFs to the sound field. The device may combine the near-field applied sound with the far-field applied sound field to generate spatial audio for playback through a plurality of speakers.

20 Claims, 7 Drawing Sheets

SPATIAL AUDIO USING NEAR-FIELD AND FAR-FIELD RENDERING

CROSS-REFERENCE TO RELATED APPLICATION

This nonprovisional patent application claims the benefit of the earlier filing date of U.S. provisional application No. 63/343,387 filed May 18, 2022.

FIELD

One aspect of the disclosure relates to spatial audio processing, to processing audio information with near-field and far-field head related transfer functions (HRTFs).

BACKGROUND

Sound may be understood as energy in the form of a vibration. The energy may propagate as an acoustic wave, through a transmission medium such as a gas, liquid or solid. A computing device may include microphones that may sense sound in the environment of the device. Each microphone may include a transducer that converts the vibrational energy into an electronic signal which may be analog or digital. The microphones may form a microphone array that senses sound and spatial characteristics (e.g., direction and/or location) of the sensed sound and sound field.

SUMMARY

In some aspects, a method includes extracting a sound (e.g., a near-field sound) and a sound field (e.g., one or more far-field sounds) from microphone signals of microphones of a capture device, adjusting a strength of the sound based on a strength of the sound field, applying near-field head related transfer functions (HRTFs) to the sound, applying far-field HRTFs to the sound field, and combining the near-field applied sound with the far-field applied sound field to form spatial audio for playback through a plurality of speakers.

A device may include a plurality of microphones, and a processor, configured to extract a sound (e.g., a near-field sound) and a sound field (e.g., one or more far-field sounds) from microphone signals of the plurality of microphones. The device may adjust a strength of the sound based on a strength of the sound field, apply near-field head related transfer functions (HRTFs) to the sound, and apply far-field HRTFs to the sound field. The device may combine the near-field applied sound with the far-field applied sound field to generate spatial audio for playback through a plurality of speakers.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
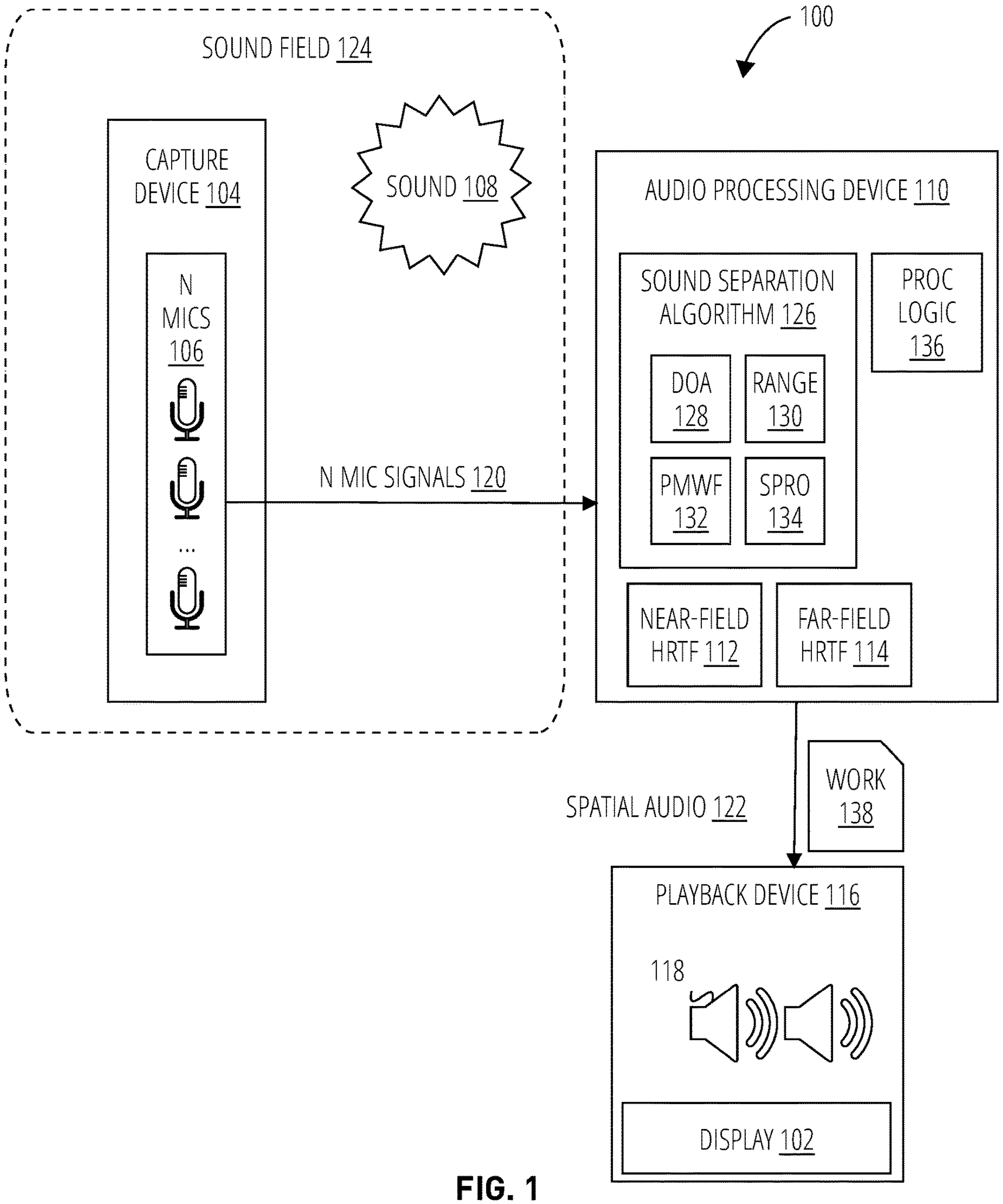
FIG. 1 shows an example processing device for processing audio with near-field head related transfer functions (HRTFs) and far-field HRTFs, in accordance with some aspects.

An audio capture device may capture sound in an environment by sensing a sound field (e.g., sound waves that propagate through a medium such as air) in the environment. The sound field may include sound waves that emanate from sound sources in the near-field and sound sources in the far-field.

Sound waves in the near-field of a sound source may have different acoustic characteristics than sound waves in the far-field of the sound source. For example, near-field sound waves may be treated as being curved, radiating from the sound source in concentric waves, while those in the far-field may be treated as being curved. In the far-field, the sound pressure and acoustic particle velocity may be treated as being in phase. Further, in the far-field, the inverse square law describes that the sound pressure level decreases by 6 dB for each doubling of the distance from the source where in the near-field, the distance from the sound source and the listener is negligible.

Humans can estimate the location of a sound by analyzing the sounds at their two ears. This is known as binaural hearing and the human auditory system can estimate directions of sound using the way sound diffracts around and reflects off our bodies and interacts with our pinna. These spatial cues can be artificially generated by applying spatial filters such as head-related transfer functions (HRTFs) or head-related impulse responses (HRIRs) to audio signals. HRTFs are applied in the frequency domain and HRIRs are applied in the time domain.

The spatial filters can artificially impart spatial cues into the audio that resemble the diffractions, delays, and reflections that are naturally caused by our body geometry and pinna. The spatially filtered audio can be produced by a spatial audio reproduction system (a renderer) and output through headphones. Spatial audio can be rendered for playback, so that the audio is perceived to have spatial qualities, for example, originating from a location above, below, or to the side of a listener.

Given the difference in characteristics between near-field and far-field sounds, applying far-field HRTFs to a near-field sound may produce an undesirable result such as the sound appearing at a random location during playback, or resulting in an audible artifact.

HRTFs are essentially independent of sound source distance in the far-field but may vary significantly in the near-field. Sound sources in the near field may retain, in their sound waves, a spherical wave pattern that radiates outward from a point source. In contrast, sound sources in the far-field may resemble and be treated as a plane wave. As such, the effect of the human anatomy, ears, and ear position may differ for near-field sounds and far-field sounds. As such, if far-field HRTFs are applied to near-field sounds, this may result in an inaccurate spatial rendering of the near-field sound.

Further, near-field sounds may have an unpredictable strength (e.g., a loudness) given the sound's proximity to a capture device. Thus, it may be beneficial to process audio in view of the differences between near-field and far-field sounds, in a manner that improves the clarity and intelligibility of the reproduced sound for various audio capture devices.

In the present disclosure, a mixed audio processing model analyzes the sound field to identify and process near-field and far-field sounds separately. By doing so, a pleasing and realistic experience can be achieved that accounts for acoustic differences between near-field sounds and far-field sounds.

In some aspects, spatial audio playback may be generated using a fixed pre-defined region or regions around a capture device. Sounds located within the region may be treated as a near-field sound and sounds outside of the region may be treated as a far-field sound. The spatial rendering may utilize near-field or far-field assumptions. For example, when recording with a hand-held capture device, processing logic may assume that near-field sounds originate behind the device where a person holds the device and speaks while recording a scene (e.g., with a camera) in front of the device.

In some aspects, spatial audio playback may be generated using range or distance estimation to delineate what is a near-field sound and what is a far-field sound. A range estimation algorithm may be applied to microphone signals to estimate the distance or range of a sound. The sound may be rendered (e.g., with a near-field HRTF or a far-field HRTF) accordingly.

In some aspects, a source separation algorithm may be applied to the sound field to extract one or more near-field sources directly from microphone signals. The one or more near-field sources may be subtracted from the sound field. The remaining sound field and the one or more near-field sources may be separately stored, transmitted, and spatially rendered (e.g., with a near-field HRTF or a far-field HRTF).

More generally, a method may comprise extracting a sound and a sound field from microphone signals of microphones of a capture device, adjusting a strength of the sound based on a strength of the sound field. Near-field head related transfer functions (HRTFs) are applied to the sound, resulting in near-field applied sound. Far-field HRTFs are applied to the sound field resulting in far-field applied sound. The near-field applied sound and the far-field applied sound field are combined to form spatial audio for playback through a plurality of speakers.

In some aspects, applying the near-field HRTFs to the sound repositions the near-field applied sound during playback. For example, the near-field applied sound may be repositioned to be centered near-field in front of a listener during playback. The near-field applied sound may be repositioned according to a user input or a configurable setting that indicates a desired virtual position of the near-field applied sound during playback.

In some aspects, extracting the sound includes processing the microphone signals to sense sound at a fixed region relative to the capture device as the sound to which the near-field HRTFs are to be applied to. In such a manner, sound within the fixed region may be identified and treated as near-field sound and sound outside of the fixed region may be identified and treated as far-field sound.

The fixed region may be specific to the capture device. For example, the capture device may include a handheld device that includes a camera. The fixed region may be located behind a direction that the camera is pointed towards. In such a manner, the assumption that a user is standing and speaking behind the handheld device while recording a scene in front of the user is leveraged. In another example, the capture device comprises a worn device (e.g., a headphone set, smart glasses, a head-mounted display, etc.) and the fixed region may be positioned at a user's mouth who is wearing the worn device.

In some aspects, extracting the sound and the sound field comprises estimating a distance from the capture device to a sensed sound and extracting the sensed sound as the sound to which the near-field HRTFs are to be applied to, in response to the distance being less than a threshold. In such a manner, distance may be used to identify whether a sound is to be treated as a near-field sound or a far-field sound.

In some aspects, extracting the sound and the sound field comprises extracting the sound from the microphone signals and subtracting the near-field sound from the microphone signals to obtain the sound field. The near-field sound and the sound field may be stored electronically or transmitted to a second device, as separate signals, prior to combining.

The spatial audio may correspond to visual components that together form an audiovisual work. An audiovisual work may include a movie, a live show, an application, or a live video call. In some examples, the audiovisual work may be integral to extended reality (XR) environment and the near-field or far-field sound may correspond to one or more virtual objects in the XR environment. An XR environment can include mixed reality (MR) content, augmented reality (AR) content, virtual reality (VR) content, and/or the like. With an XR system, some of a person's physical motions, or representations thereof, can be tracked and, in response, characteristics of virtual objects simulated in the XR environment can be adjusted in a manner that complies with at least one law of physics. For instance, the XR system can detect the movement of a user's head and adjust graphical content and auditory content presented to the user like how such views and sounds would change in a physical environment. In another example, the XR system can detect movement of an electronic device that presents the XR environment (e.g., a mobile phone, tablet, laptop, or the like) and adjust graphical content and auditory content presented to the user like how such views and sounds would change in a physical environment. In some situations, the XR system can adjust characteristic(s) of graphical content in response to other inputs, such as a representation of a physical motion (e.g., a vocal command).

Many distinct types of electronic systems can enable a user to interact with and/or sense an XR environment. A non-exclusive list of examples includes heads-up displays (HUDs), head mountable systems, projection-based systems, windows or vehicle windshields having integrated display capability, displays formed as lenses to be placed on users' eyes (e.g., contact lenses), headphones/earphones, input systems with or without haptic feedback (e.g., wearable or handheld controllers), speaker arrays, smartphones, tablets, and desktop/laptop computers. A head mountable system can have one or more speaker(s) and an opaque display. Other head mountable systems can be configured to accept an opaque external display (e.g., a smartphone). The head mountable system can include one or more image sensors to capture images/video of the physical environment and/or one or more microphones to capture audio of the physical environment. A head mountable system may have a transparent or translucent display, rather than an opaque display. The transparent or translucent display can have a medium through which light is directed to a user's eyes. The display may utilize various display technologies, such as uLEDs, OLEDs, LEDs, liquid crystal on silicon, laser scanning light source, digital light projection, or combinations thereof. An optical waveguide, an optical reflector, a hologram medium, an optical combiner, combinations thereof, or other similar technologies can be used for the medium. In some implementations, the transparent or translucent display can be selectively controlled to become opaque. Projection-based systems can utilize retinal projection technology that projects images onto users' retinas. Projection systems can also project virtual objects into the physical environment (e.g., as a hologram or onto a physical surface). Immersive experiences such as an XR environment, or other audio works, may include spatial audio.

FIG. 1 shows an example audio processing system 100 for processing audio with near-field HRTFs and far-field HRTFs, in accordance with some aspects. Audio processing system 100 may include a capture device 104, an audio processing device 110, and a playback device 116. In some aspects, some, or all the capture device 104, audio processing device 110, and the playback device 116 may be integral to a common device. In other cases, they may be separate devices, which may have the same, similar, or different hardware and software. Examples of the capture device 104, the audio processing device 110, and the playback device 116 include a laptop (as shown), a desktop, a monitor, a mobile phone, a tablet computer, a head-worn device, a television, a smart speaker, or other audio processing device.

Capture device 104 may include two or more microphones 106 that form a microphone array. Microphones 106 may have fixed and known locations. The microphones 106 may sense spatial information of one or more sounds 108 in sound field 124. Each of the microphones may generate respective microphone signals 120 that electronically carry the sound field 124 and the one or more sounds 108.

An audio processing device 110 may include processing logic 136 that is configured to perform operations and methods described in the present disclosure, such as method 600 and aspects thereof. Processing logic 136 may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Audio processing device 110 may obtain the microphone signals 120 from capture device 104. Audio processing device 110 may extract sound 108 and sound field 124 from microphone signals 120 of the plurality of microphones 106 using one or more sound separation algorithms 126. Sound 108 may include one or more sounds in the near-field or the far-field. The audio processing device 110 determines, based on distance, a fixed region, or other operations described herein, whether to treat sound 108 as near-field sound or far-field sound. The audio processing device 110 may serve as a decoder that determines a direction of a sound relative to the capture device, a range or distance of a sound relative to the capture device, or both, to determine whether it is to be treated as a near-field sound or a far-field sound.

In some examples, extracting the sound from the microphone signals 120 includes processing the microphone signals 120 to sense sound that is within a fixed region relative to the capture device as the sound to which near-field HRTFs 112 are to be applied to. For example, if sound 108 is sensed as present in the fixed region, then audio processing device 110 applies the near-field HRTFs 112 to the sound 108. If not, then audio processing device 110 applies far-field HRTFs 114 to sound 108. In some examples, sound 108 may include one or more sound sources.

In some examples, the audio processing device 110 may apply a direction of arrival (DOA) 128 algorithm to the microphone signals 120 to determine the direction of sound 108 relative to the capture device 104. The DOA algorithm 128 may include identifying a relative position of sound 108 with respect to the microphones 704. The DOA algorithm 128 may include analyzing the microphone signals 120 to determine a time-delay-of-arrival (TDOA) between the microphones 106 for each of the sound sources in the sound field and then using the TDOA to determine a direction of each sound relative to the microphones 704. As such, the direction may indicate whether a sound such as sound 108 is emanating from the fixed region.

Additionally, or alternatively, extracting the sound 108 and the sound field 124 may comprise applying a range estimation algorithm 130 to the microphone signals 120 to estimate a distance from the capture device to a sensed sound. The audio processing device may extract the sensed sound as the sound to which the near-field HRTFs are to be applied to, in response to the distance being less than a threshold.

For example, the range estimation algorithm 130 may be applied to the microphone signals to estimate that sound 108 is sensed at distance 'x' away from the microphones 704. In response to this distance satisfying a threshold (e.g., being less than a threshold distance 'y'), audio processing device 110 may treat sound 108 as a near-field sound and apply the near-field HRTFs 112 to sound 108. The audio processing device 110 may treat sounds in sound field 124 that do not satisfy the threshold (e.g., equal, or greater than distance 'y') as a far-field sound and apply far-field HRTFs 114 to those sounds.

In some aspects, audio processing device 110 may extract the sound 108 from the microphone signals 120 as the near-field sound and subtract this near-field sound from the microphone signals to obtain the sound field 124. As such, the sound field 124 may be the remaining sound field (without the near-field sound 108).

Extraction of the near-field sound (e.g., sound 108) may be accomplished with a parametric multichannel Wiener filter 132 (PMWF) and a source probability estimation algorithm 134 (SPRO). The PMWF 132 and SPRO 134 may be guided by an a priori known steering vector that points in the direction of the near-field source (e.g., sound 108). In some examples, the PMWF 132 may obtain a probability that a source is present at a given direction from the SPRO 134 and then apply the PMWF to the microphone signals, in view of the direction, if the probability satisfies a threshold. The PMWF filters the microphone signals to extract sound 108. The audio processing device 110 may then subtract from the microphone signals 120, the extracted sound 108, to obtain the remaining sound field 124 without the sound

108. As such, the remaining sound field 124 and sound 108 may be processed independently. The sound 108 may be treated as a near-field sound and have applied to it, near-field HRTFs 112. Similarly, the remaining sound field 124 may be treated as far-field sound and have applied to it, far-field HRTFs 114.

The audio processing device 110 may adjust (e.g., reduce) a strength of the sound (e.g., sound 108) based on of a strength of the sound field (e.g., sound field 124 without sound 108). For example, a gain may be adjusted to reduce a difference between a playback loudness of sound 108 and a playback loudness of the far-field sounds (e.g., the remaining sound field 124). The strength of the sound 108 may be adjusted prior to combining the near-field applied sound with the far-field applied sound. The audio processing device 110 may reduce the strength of the sound less aggressively or not at all, in response to the remaining sound field (e.g., far-field sounds) having a high strength. The audio processing device 110 may reduce the strength of the sound more aggressively in response to the remaining sound field having a low strength. In such a manner, the strength of a near-field sound may be adjusted to have less of a masking effect on far-field sounds, and both near-field and far-field sound may be more intelligible during playback.

In response to identifying a sound (e.g., 108) as a near-field sound, the audio processing device 110 may apply near-field head related transfer functions (HRTFs) to the sound. Similarly, the audio processing device 110 may apply far-field HRTFs to the sound field 124 which may be without the near-field sound.

HRTFs 112 and 114 may be applied to audio signal (e.g., sound 108 or the remaining sound field 124) in the frequency domain. HRIRs may be applied to an audio signal (e.g., through convolution) in the time domain. The operations described herein may be performed in the time domain or frequency domain. As such, HRTF and HRIR may be used interchangeably in the present disclosure.

In some aspects, near-field HRTFs 112 may be synthesized from far-field HRTFs 114. For example, audio processing device 110 may apply a distance variation function, a difference filter, or a cross-ear algorithm to the far-field HRTFs 114 to generate near-field HRTFs 112. In other aspects, audio processing device 110 may manage or obtain the near-field HRTFs 112 and far-field HRTF 114 as separate libraries of HRTFs. In some aspects, near-field HRTFs 112 can be synthesized by applying a directional rigid sphere transfer function (STF) for a point source in the near field to far-field HRTFs 114. Far-field HRTFs may be generated based on measured data (e.g., with microphones on a human head or a dummy) or other techniques.

The audio processing device 110 may combine the near-field applied sound (e.g., sound 108 with near-field HRTFs applied to it) with the far-field applied sound field (e.g., sound field 124 with the far-field HRTFs applied to it) to generate spatial audio 122 for playback through a plurality of speakers 118 of playback device 116.

The speakers 118 may include left and right ear-worn speakers. Ear-worn speakers include speakers that are worn in-ear, on-ear, or over-the-ear. In some aspects, an ear-worn speaker may be worn off-the-ear (e.g., bone-conduction speakers). Spatial audio 122 may comprise binaural audio that includes a left audio channel and a right audio channel. The channels each include the sound field 124 with one or more sounds 108 with spatial cues (e.g., binaural cues and spectral characteristics) imparted from near-field HRTFs 112 and far-field HRTF 114. The spatial cues may include frequency dependent gains and/or phase shifts that imitate the effect of our ears such as the pinna and location of each ear on a head and the effect of other anatomy (e.g., the human body) on sound.

In some aspects, spatial audio 122 is part of an audio or audiovisual work 138. The work 138 may include one or more visual components that have corresponding visual and audible virtual locations. For example, spatial audio 122 and work 138 may include a sound which is perceived as coming from bird in the far-field location and a voice narration which is perceived to be coming from the near-field in front of the listener. Visual representations of bird and a speaker may, during playback, be shown on display 102 of the playback device 116, simultaneous to the playback of spatial audio 122.

Figure 2:
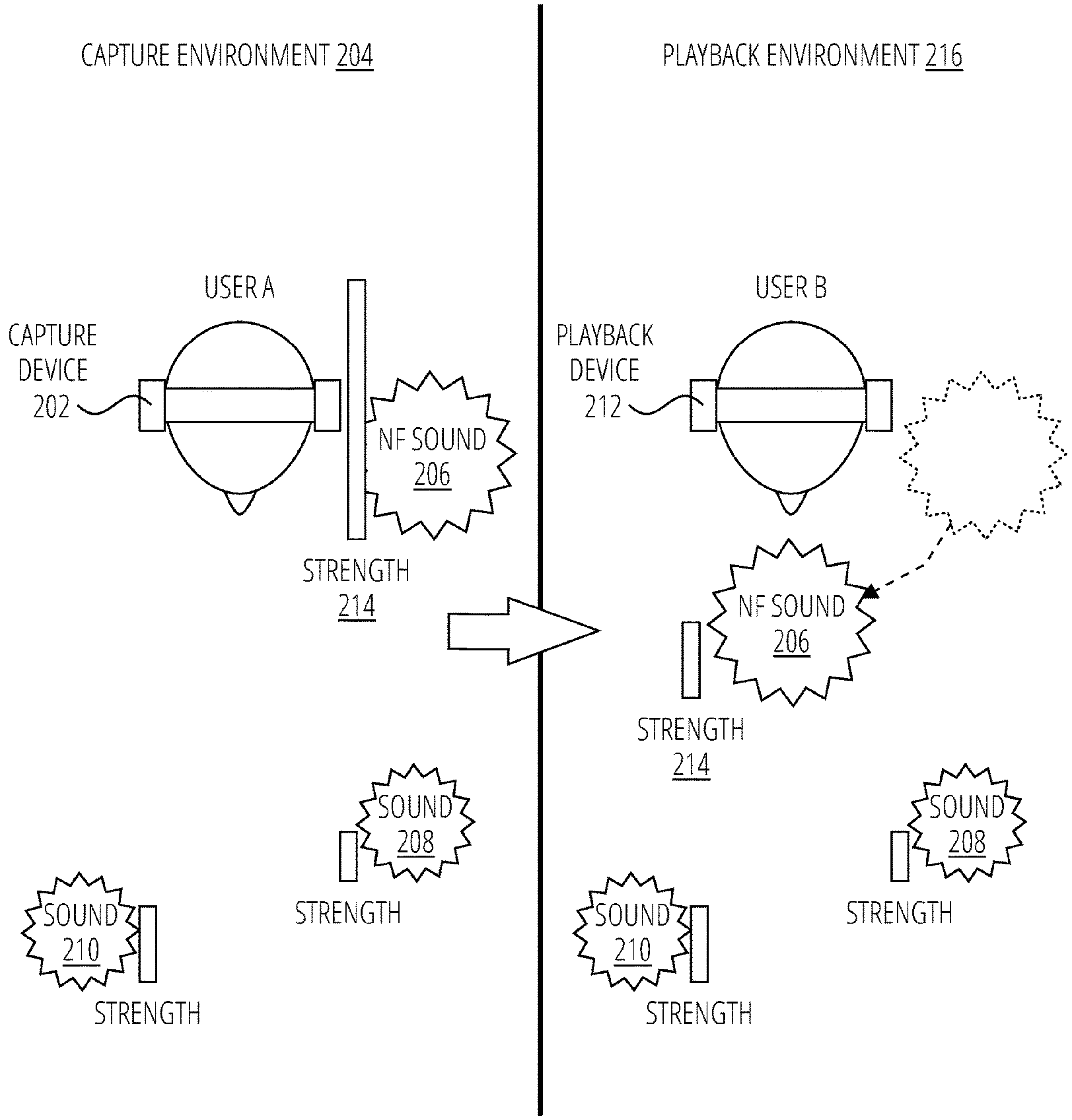
FIG. 2 shows an example of an audio capture environment and an audio playback environment, in accordance with some aspects.

FIG. 2 shows an example of an audio capture environment 204 and an audio playback environment 216, in accordance with some aspects. Capture device 202 may have a microphone array that captures a sound field in the capture environment 204. The sound field may include a near-field sound 206 and sounds 210 and 208 in the far-field.

An audio processing device such as those described in other sections may identify and extract near-field sound 206. The audio processing device may adjust the strength 214 of the near-field sound 206 based on the strength of the far-field sounds 210 and 208. The strength adjustment may be made by adjusting a gain or loudness value that represents the playback loudness of the near-field sound 206. In some aspects, an overall strength of the far-field sounds or the remaining sound field may be determined (e.g., as a combined or average strength). In some aspects, the strength of the near-field sound 206 may be adjusted to reduce the difference in strength between the near-field sound and the far-field sound. In some aspects, the strength of the near-field sound may be adjusted according to an algorithm, a value (e.g., a ratio), a setting (e.g., a ratio), or a combination thereof. The setting or algorithm may be adjusted (e.g., by a user). As such, a user (e.g., user A) may author a work and control how loud a near-field sound is to be rendered relative to far-field sound. In some aspects, the strength of far-field sound is not adjusted. Thus, far-field sound may be reproduced according to how it was originally sensed by the capture device, while near-field sound is strength-adjusted.

Further, the audio processing device may reposition the near-field sound 206. For example, in the capture environment 204, the near-field sound 206 may be located at a first position (e.g., to the side, behind, above, etc.) relative to the capture device 202. The audio processing device may apply near-field HRTFs to the near-field sound 206 to reposition the sound at a second location (different from the first position) in the playback environment 216. In some aspects, near-field sound is repositioned while other sounds are not repositioned. The near-field sound may be repositioned to have a virtual position that is centered in front of the listener in the near-field. The audio processing device may apply far-field HRTFs to the remaining sound field with far-field sounds 210 and 208.

The near-field sound 206 (after strength adjustment, repositioning, and spatial rendering with near-field HRTFs) and the far-field sounds 208 and 210 (after spatial rendering with far-field HRTFs) are combined to form a spatial audio representation of the captured sound field. The playback device 212 may play the spatial audio to a listener (e.g., user B) as part of an audio work. The near-field sound may be rendered with improved intelligibility or plausibility from the separate treatment of sounds with the near-field and far-field HRTFs, and from the repositioning and strength adjustment of the near-field sound.

Figure 3:
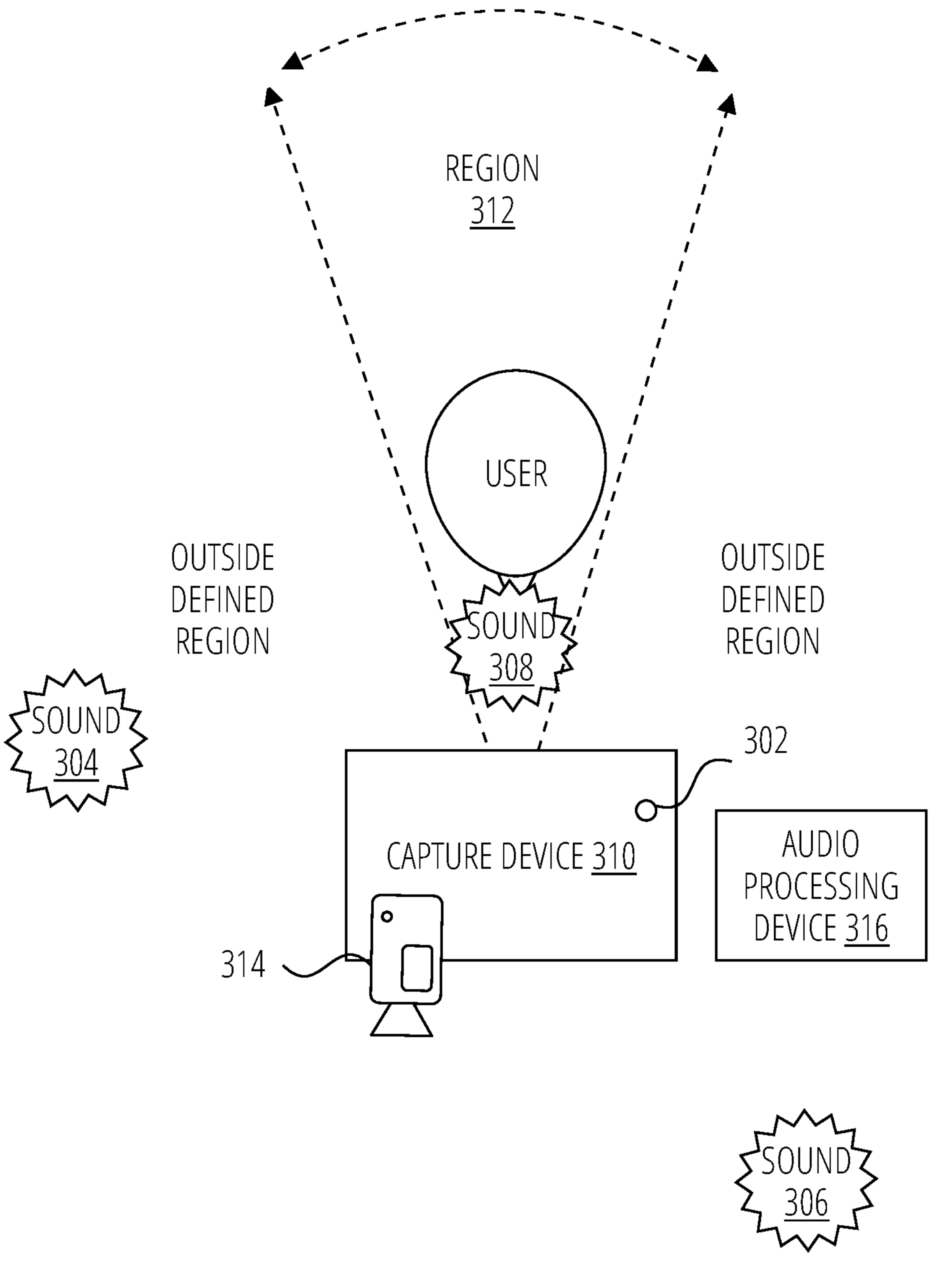
FIG. 3 illustrates an example of spatial audio processing with a fixed near-field region, in accordance with some aspects.

FIG. 3 illustrates an example of spatial audio processing with a fixed near-field region, in accordance with some aspects. A capture device 310 may have a microphone array 302 that senses a sound field in a capture environment. An audio processing device 316 may obtain microphone signals from the capture device 310 and process them with near-field HRTFs and far-field HRTFs.

The audio processing device 316 may extract a sound such as sound 308 in region 312, and a sound field such as the remaining sound field outside of region 312, from microphone signals of the microphone array 302 of the capture device 310.

The audio processing device may identify the sound (e.g., sound 308) as a near-field sound, and in response, adjust a strength of the sound (e.g., sound 308) based on a strength of the sound field (e.g., the sounds 304 and 306 that are outside of region 312).

In particular, the audio processing device 316 may process the microphone signals to sense sound at a fixed region (e.g., region 312) relative to the capture device as the sound to which the near-field HRTFs are to be applied to. For example, region 312 may be fixed relative to capture device 310 such that if the capture device moves or rotates, the region 312 moves or rotates with it. Audio processing device 316 may apply a DOA algorithm to the microphone signals to sense any sound in region 312 and identify such sounds as a near-field sound. All other sounds outside the region 312 may be identified as far-field sounds.

The audio processing device may apply near-field head related transfer functions (HRTFs) to the sound (e.g., sound 308) and apply far-field HRTFs to the sound field (e.g., sounds 304 and 306). The audio processing device 316 may combine the near-field applied sound with the far-field applied sound field to form spatial audio for playback through a plurality of speakers (e.g., of a playback device).

In some aspects, the region may be delineated as a direction or a range of directions. Further, although shown as simple illustrations, the examples described apply to three-dimensional capture and playback environments. For example, the region 312 may include a direction or range in spherical coordinates (e.g., between azimuth X and Y, and between elevation A and B) or other three-dimensional coordinate system.

In some examples, the capture device 310 may comprise a handheld device that includes a camera 314. The fixed region may be located behind a direction that the camera is pointed towards. For example, as shown here, the designated near-field region 312 may be located opposite of the direction the camera is pointed in. In such a manner, the audio processing device 316 may assume that the user who is capturing the scene with the capture device may speak or make other sounds during the capture.

In some examples, the capture device 310 may comprise a worn device (e.g., a head-worn device). In such a case, the fixed region may be positioned at a user's mouth who is wearing the worn device. For example, audio processing device 316 may process the microphone signals (e.g., using a DOA algorithm to fix region 312 at a user's mouth, relative to the worn device.

In such a manner, the near-field sound (e.g., sound 308) may be attributed to the user of the capture device, and the user's sounds (e.g., speech) may be processed as a near-field sound, as described (e.g., with near-field HRTFs, strength adjustment, repositioning, or a combination thereof).

Figure 4:
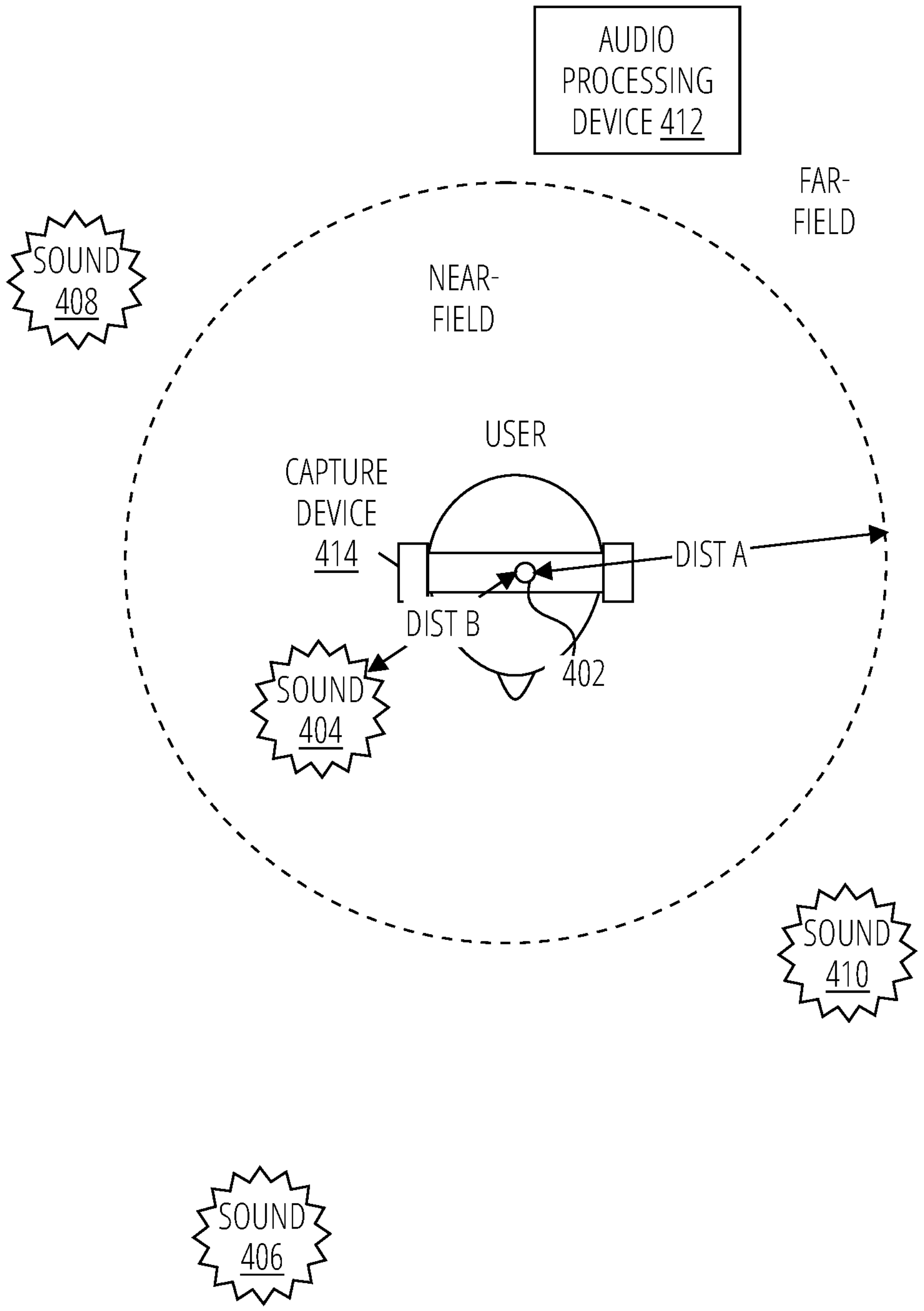
FIG. 4 illustrates an example of spatial audio processing with distance-based audio sensing, in accordance with some aspects.

FIG. 4 illustrates an example spatial audio processing system with distance-based audio sensing, in accordance with some aspects.

Capture device 414 may include a headworn device or a handheld device. The capture device may include a plurality of microphones 402 which may form a microphone array. Each of the microphones 402 may sense a sound field in the capture environment to generate respective microphone signals. Audio processing device 412 may obtain the microphone signals and extract a sound (e.g., sound 404) in the near-field and a sound field (e.g., sound outside of the near-field) from microphone signals of microphones of a capture device. The audio processing device 412 may adjust a strength of the sound (e.g., sound 404) based on a strength of the sound field. The audio processing device 412 may apply near-field head related transfer functions (HRTFs) to the sound (e.g., sound 404) and apply far-field HRTFs to the sound field (e.g., sounds 406, 408, and 410 in the far-field). The audio processing device 412 may combine the near-field applied sound (e.g., sound 404) with the far-field applied sound field (e.g., sounds 406, 408, and 410) to form spatial audio (e.g., binaural audio). The binaural audio may be used to drive speakers of a playback device.

The audio processing device 412 may estimate a distance (e.g., distance B) from the capture device 414 to a sensed sound (e.g., sound 404) and extract the sensed sound as the sound to which the near-field HRTFs are to be applied to in response to the distance being less than a threshold (e.g., distance A). For example, audio processing device 412 may apply a range estimation algorithm (e.g., range estimation algorithm 130) and/or a DOA algorithm (e.g., DOA algorithm 128) to the microphone signals to determine a distance between each of the sounds (e.g., sound 404, 406, 408, and 410) and the capture device 414. The audio processing device 412 may treat each sound that is closer than the threshold as being a near-field sound and treat each sound that is beyond the threshold as a far-field sound. The audio processing device 412 may treat each sound according to the near-field or far-field designation. For example, near-field sound may be strength adjusted, repositioned, and processed with near-field HRTFs. Far-field sound may be processed with far-field HRTFs.

In some examples, there are no pre-defined areas and the audio processing device 412 relies solely on range or distance of each sound to determine if the sound is to be treated as a near-field sound or a far-field sound. In other examples, the audio processing device 412 may use a hybrid approach of using one or more fixed regions (e.g., as described with respect to FIG. 3) in combination with the distance-based threshold described. For example, if a sound is in a fixed region or satisfies the distance threshold, then it may be treated as a near-field sound. Otherwise, it may be treated as a far-field sound.

Figure 5:
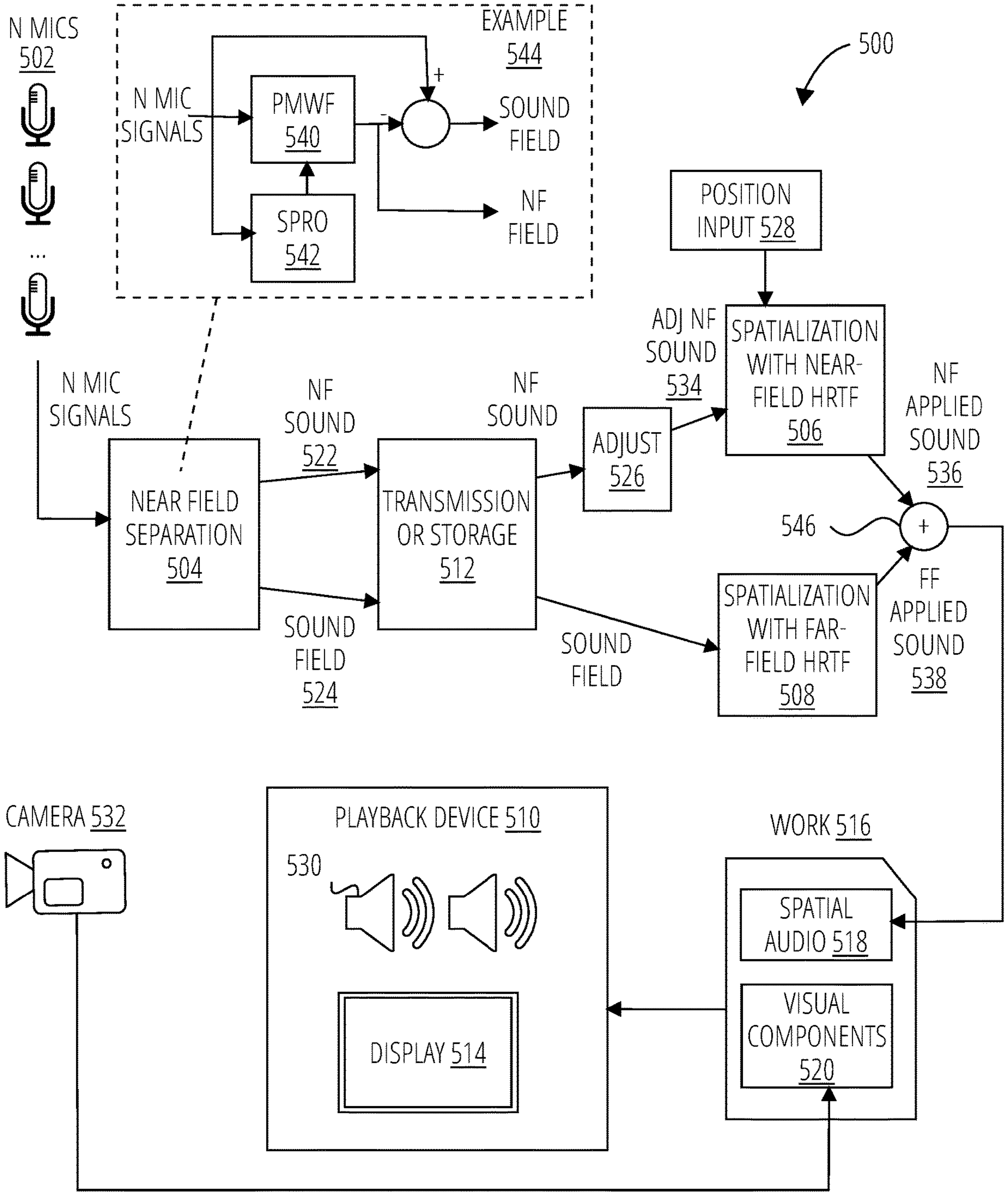
FIG. 5 illustrates an example workflow of an audio processing system that uses near-field and far-field spatial audio processing, in accordance with some aspects.

FIG. 5 illustrates an example workflow of an audio processing system 500 that uses near-field and far-field spatial audio processing, in accordance with some aspects. The workflow may be applied for other aspects such as those shown in other figures.

A plurality of microphones 502 may form a microphone array that captures sound in an environment. At block 504, the audio processing system 500 may extract near-field sound 522 from the sound field 524. As such, sound field 524 may include remaining sound in the environment (e.g., far-field sound) without near-field sound 522.

Example 544 shows an implementation of near-field separation block 504 in accordance with some aspects. A source probability estimation algorithm 542 (SPRO) may be applied to the microphone signals to determine the probability of a sound source in the microphone signals at a sensed location. The probability and location output of SPRO 542 may be provided as input to inform a multichannel parametric Wiener filter 540. The multichannel parametric Wiener filter 540 is applied to the microphone signals in view of the input, to extract near-field sound 522 from the microphone signals. The multichannel parametric Wiener filter 540 outputs near-field sound 522 which is then subtracted from the microphone signals to obtain sound field 524 (e.g., one or more far-field sounds without the one or more near-field sounds). The audio processing system 500 may implement other algorithms to directly extract the near-field sound from the sound-field, such as, for example, beamforming, blind source separation, etc.

At block 512, the audio processing system 500 may store the near-field sound 522 and the sound field 524 in computer-readable memory (e.g., non-volatile memory). In some aspects, the near-field sound 522 and sound field 524 may be transmitted to a separate device for further processing. In some aspects, the near-field sound 522 and the sound field 524 may be stored as separate signals which may each include metadata identifying and describing the signal.

At block 526, the audio processing system 500 may adjust (e.g., reduce) a strength of near-field sound 522 based on the strength of sound field 524 or the one or more far-field sounds contained within sound field 524, resulting in strength adjusted near-field sound 534. At block 506, the audio processing system 500 may apply near-field HRTFs to the strength adjusted near-field sound 534 resulting in near-field applied sound 536.

In some aspects, the audio processing system 500 may select the near-field HRTFs to reposition the near-field sound. For example, if the near-field sound source is originally sensed in the sound field at a first location, the audio processing system 500 selects near-field HRTFs that are to reposition the near-field sound source to a second location (during playback). The audio processing system 500 may, in some cases, default to a pre-defined position. For example, the near-field sound source may be repositioned to be in front of and centered relative to a listener, as a default. Additionally, or alternatively, the audio processing system 500 may select the near-field HRTFs based on a position input 528 such as user input or settings. For example, the audio processing system may receive a user input or refer to settings which may be exposed to a user that indicate that a playback position 'X' for near-field sound. The audio processing system 500 may select near-field HRTFs that include spatial cues that correspond to position 'X' and apply these to the near-field sound. Thus, a user may configure position input 528 to indicate where near-field sounds are to be virtually played back to a listener.

At block 508, the audio processing system 500 may apply far-field HRTFs to the sound field 524. As discussed, in some examples, the near-field HRTFs may be derived from the far-field HRTFs. In other examples, the near-field HRTFs may be synthesized separately.

At block 546, the near-field applied sound 536 and the far-field applied sound 538 are combined to form spatial audio 518. The spatial audio 518 may be used to drive speakers 530 of a playback device 510. Playback device 510 may include a worn device, and speakers 530 may include a left ear-worn speaker and a right ear-worn speaker.

In some examples, the spatial audio 518 may be included as part of a work 516 that also includes visual components 520. The work 516 may be an audiovisual work where the spatial audio 518 and the visual components 520 provide an immersive playback environment such as an XR environment. Near-field and/or far-field sound sources in the spatial audio 518 may each correspond to visual objects that may be shown on display 514. Each visual object may have a virtual location shown to a user that matches the virtual location of the sound source in the spatial audio. For example, during playback, a bird may be shown in the far-field at location 'Y' while a bird chirp is simultaneously output with spatial cues corresponding to location 'Y.'

In some aspects, the visual components 520 may be generated from or derived from images captured by a camera 532. The camera 532 may capture the same capture environment as that of the microphones 502 in a simultaneous manner.

Figure 6:
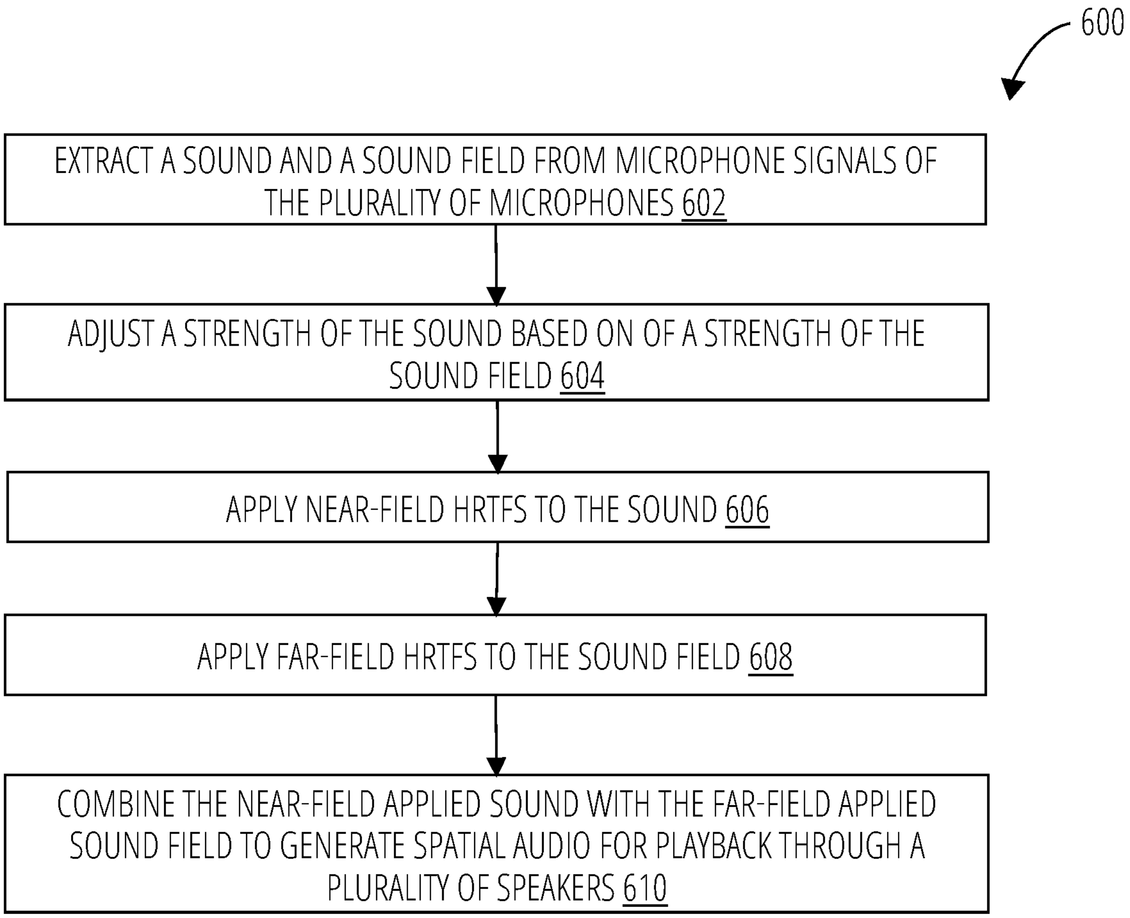
FIG. 6 illustrates a method for processing audio with near-field HRTFs and far-field HRTFs, in accordance with some aspects.

FIG. 6 illustrates a method 600 for preserving audio information from an authoring environment of an audio work when the authoring environment includes headworn speakers, in accordance with some aspects. The method may be performed with various aspects described. The method may be performed by processing logic of a capture device, an audio processing device, or a combination thereof. Processing logic may include hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof.

Although specific function blocks ("blocks") are described in the method, such blocks are examples. That is, aspects are well suited to performing various other blocks or variations of the blocks recited in the method. It is appreciated that the blocks in the method may be performed in an order different than presented, and that not all the blocks in the method may be performed.

At block 602, processing logic may extract a sound (e.g., near-field sound) and a sound field (e.g., non-near-field sound) from microphone signals of microphones of a capture device. As discussed, processing logic may apply one or more algorithms such as algorithms 126 other algorithms, to extract the sound and the sound field from the microphone signals.

In some aspects, at block 602, processing logic may refer to metadata of a capture device to determine how to extract the sound from the sound field. For example, metadata may indicate a model number or type (e.g., handheld, head-worn, etc.) of the capture device. In response to the metadata showing that the capture device is a handheld capture device, processing logic may identify the sound as near-field based on a fixed region (e.g., behind a camera direction). In response to the metadata showing that the capture device is a head-worn device, processing logic may identify the sound as near-field based on the fixed region being at a mouth of the user or based on a threshold distance. In response to the metadata showing that the capture device is a stationary device (e.g., a smart speaker, a television, etc.), processing logic may identify the sound as near-field based on the threshold distance or based on PMWF and SPRO. As such, processing logic may automatically (e.g., without human input) and dynamically separate near-field and far-field sounds based on the capture device and assumptions about the use of capture device, thereby tailoring audio processing to fit different situations or capture devices.

At block 604, processing logic may adjust a strength of the sound based on a strength of the sound field. For example, if the sound field is quiet, then the strength of the sound may be reduced a first amount. If the sound field is louder, then the strength of the sound may be reduced a second amount that is smaller than the first amount. This may improve the intelligibility of the sound so that it is not too loud during playback. Further, this may improve intelligibility of the remaining sound field so that the sound field is not masked by the sound.

At block 606, processing logic may apply near-field head related transfer functions (HRTFs) to the sound. At block 608, processing logic may apply far-field HRTFs to the sound field. At block 610, processing logic may combine the near-field applied sound with the far-field applied sound field to form spatial audio for playback through a plurality of speakers.

Figure 7:
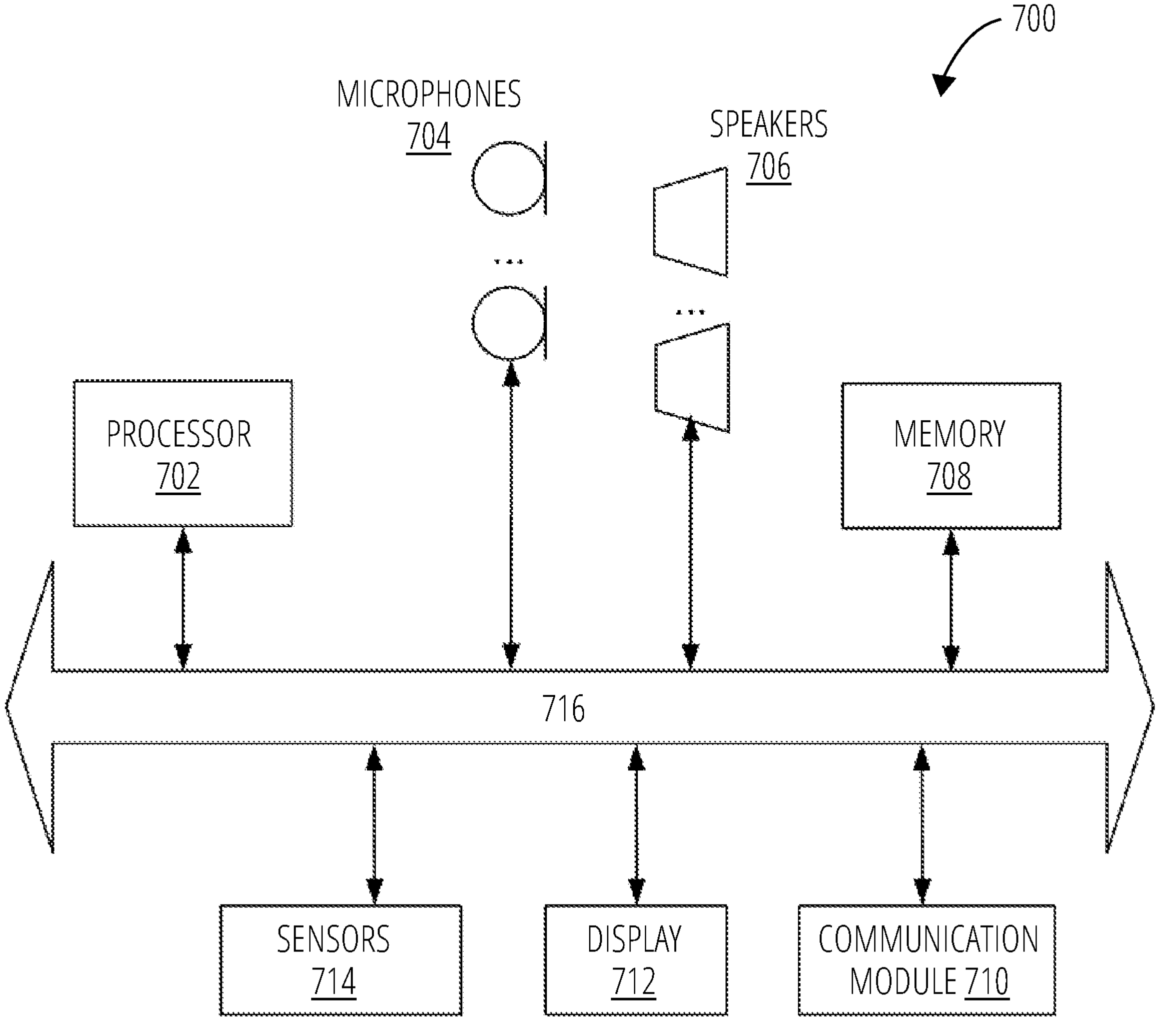
FIG. 7 illustrates an example of an audio processing system, in accordance with some aspects.

FIG. 7 illustrates an example of an audio processing system 700, in accordance with some aspects. The audio processing system can be an electronic device such as, for example, a desktop computer, a tablet computer, a smart phone, a computer laptop, a smart speaker, a media player, a household appliance, a headphone set, a head mounted display (HMD), smart glasses, an infotainment system for an automobile or other vehicle, or other computing device. The system can be configured to perform the method and processes described in the present disclosure.

Although various components of an audio processing system are shown that may be incorporated into headphones, speaker systems, microphone arrays and entertainment systems, this illustration is merely one example of a particular implementation of the types of components that may be present in the audio processing system. This example is not intended to represent any architecture or manner of interconnecting the components as such details are not germane to the aspects herein. Other types of audio processing systems that have fewer or more components than shown can also be used. Accordingly, the processes described herein are not limited to use with the hardware and software shown.

The audio processing system can include one or more buses 716 that serve to interconnect the various components of the system. One or more processors 702 are coupled to bus as is known in the art. The processor(s) may be microprocessors or special purpose processors, system on chip (SOC), a central processing unit, a graphics processing unit, a processor created through an Application Specific Integrated Circuit (ASIC), or combinations thereof. Memory 708 can include Read Only Memory (ROM), volatile memory, and non-volatile memory, or combinations thereof, coupled to the bus using techniques known in the art. Sensors 714 can include an IMU and/or one or more cameras (e.g., RGB camera, RGBD camera, depth camera, etc.) or other sensors described herein. The audio processing system can further include a display 712 (e.g., an HMD, or touchscreen display).

Memory 708 can be connected to the bus and can include DRAM, a hard disk drive or a flash memory or a magnetic optical drive or magnetic memory or an optical drive or other types of memory systems that maintain data even after power is removed from the system. In one aspect, the processor 702 retrieves computer program instructions stored in a machine readable storage medium (memory) and executes those instructions to perform operations described herein.

Audio hardware, although not shown, can be coupled to the one or more buses to receive audio signals to be processed and output by speakers 706. Audio hardware can include digital to analog and/or analog to digital converters. Audio hardware can also include audio amplifiers and filters. The audio hardware can also interface with microphones 704 (e.g., microphone arrays) to receive audio signals (whether analog or digital), digitize them when appropriate, and communicate the signals to the bus.

Communication module 710 can communicate with remote devices and networks through a wired or wireless interface. For example, the communication module can communicate over known technologies such as TCP/IP, Ethernet, Wi-Fi, 3G, 4G, 5G, Bluetooth, ZigBee, or other equivalent technologies. The communication module can include wired or wireless transmitters and receivers that can communicate (e.g., receive and transmit data) with networked devices such as servers (e.g., the cloud) and/or other devices such as remote speakers and remote microphones.

It will be appreciated that the aspects disclosed herein can utilize memory that is remote from the system, such as a network storage device which is coupled to the audio processing system through a network interface such as a modem or Ethernet interface. The buses can be connected to each other through various bridges, controllers and/or adapters as is well known in the art. In one aspect, one or more network device(s) can be coupled to the bus. The network device(s) can be wired network devices (e.g., Ethernet) or wireless network devices (e.g., Wi-Fi, Bluetooth). In some aspects, various aspects described (e.g., simulation, analysis, estimation, modeling, object detection, etc.) can be performed by a networked server in communication with the capture device.

Various aspects described herein may be embodied, at least in part, in software. That is, the techniques may be conducted in an audio processing system in response to its processor executing a sequence of instructions contained in a storage medium, such as a non-transitory machine-readable storage medium (e.g., DRAM or flash memory). In various aspects, hardwired circuitry may be used in combination with software instructions to implement the techniques described herein. Thus, the techniques are not limited to any specific combination of hardware circuitry and software, or to any source for the instructions executed by the audio processing system.

In the description, certain terminology is used to describe features of various aspects. For example, in certain situations, the terms "module", "processor", "unit", "renderer", "system", "device", "filter", "engine", "block," "detector," "simulation," "model", and "component", are representative of hardware and/or software configured to perform one or more processes or functions. For instance, examples of "hardware" include, but are not limited or restricted to, an integrated circuit such as a processor (e.g., a digital signal processor, microprocessor, application specific integrated circuit, a micro-controller, etc.). Thus, different combinations of hardware and/or software can be implemented to perform the processes or functions described by the above terms, as understood by one skilled in the art. Of course, the hardware may be alternatively implemented as a finite state machine or even combinatorial logic. An example of "software" includes executable code in the form of an application, an applet, a routine or even a series of instructions. As mentioned above, the software may be stored in any type of machine-readable medium.

Some portions of the preceding detailed descriptions have been presented in terms of algorithms and symbolic representations of operations on data bits within a computer memory. These algorithmic descriptions and representations are the ways used by those skilled in the audio processing arts to convey the substance of their work most effectively to others skilled in the art. An algorithm is here, and, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of an audio processing system, or similar electronic device, that manipulates and transforms data represented as physical (electronic) quantities within the system's registers and memories into other data similarly represented as physical quantities within the system memories or registers or other such information storage, transmission or display devices.

The processes and blocks described herein are not limited to the specific examples described and are not limited to the specific orders used as examples herein. Rather, any of the processing blocks may be re-ordered, combined, or removed, performed in parallel or in serial, as desired, to achieve the results set forth above. The processing blocks associated with implementing the audio processing system may be performed by one or more programmable processors executing one or more computer programs stored on a non-transitory computer readable storage medium to perform the functions of the system. All or part of the audio processing system may be implemented as special purpose logic circuitry (e.g., an FPGA (field-programmable gate array) and/or an ASIC (application-specific integrated circuit)). All or part of the audio system may be implemented using electronic hardware circuitry that include electronic devices such as, for example, at least one of a processor, a memory, a programmable logic device or a logic gate. Further, processes can be implemented in any combination of hardware devices and software components.

In some aspects, this disclosure may include the language, for example, "at least one of [element A] and [element B]." This language may refer to one or more of the elements. For example, "at least one of A and B" may refer to "A," "B," or "A and B." Specifically, "at least one of A and B" may refer to "at least one of A and at least one of B," or "at least of either A or B." In some aspects, this disclosure may include the language, for example, "[element A], [element B], and/or [element C]." This language may refer to either of the elements or any combination thereof. For instance, "A, B, and/or C" may refer to "A," "B," "C," "A and B," "A and C," "B and C," or "A, B, and C."

While certain aspects have been described and shown in the accompanying drawings, it is to be understood that such aspects are merely illustrative of and not restrictive, and the disclosure is not limited to the specific constructions and arrangements shown and described, since various other modifications may occur to those of ordinary skill in the art.

To aid the Patent Office and any readers of any patent issued on this application in interpreting the claims appended hereto, applicants wish to note that they do not intend any of the appended claims or claim elements to invoke 35 U.S.C. 112 (f) unless the words "means for" or "step for" are explicitly used in the particular claim.

It is well understood that the use of personally identifiable information should follow privacy policies and practices that are recognized as meeting or exceeding industry or governmental requirements for maintaining the privacy of users. Personally identifiable information data should be managed and managed to minimize risks of unintentional or unauthorized access or use, and the nature of authorized use should be clearly indicated to users.

What is claimed is:

1. A method comprising:

extracting a sound and a sound field from microphone signals of microphones of a capture device;

adjusting a strength of the sound based on a strength of the sound field;

producing a near-field applied sound by applying near-field head related transfer functions (HRTFs) to the sound;

producing a far-field applied sound field by applying far-field HRTFs to the sound field; and combining the near-field applied sound with the far-field applied sound field to form spatial audio for playback through a plurality of speakers.

2. The method of claim 1, wherein applying the near-field HRTFs to the sound repositions the near-field applied sound during the playback.

3. The method of claim 2, wherein the near-field applied sound is repositioned to be centered near-field in front of a listener during the playback.

4. The method of claim 2, wherein the near-field applied sound is repositioned according to a user input or a configurable setting that indicates a desired virtual position of the near-field applied sound during the playback.

5. The method of claim 1, wherein extracting the sound includes processing the microphone signals to sense sound at a fixed region relative to the capture device as the sound to which the near-field HRTFs are to be applied to.

6. The method of claim 5, wherein the capture device comprises a handheld device that includes a camera, wherein the fixed region is behind a direction that the camera is pointed towards.

7. The method of claim 5, wherein the capture device comprises a worn device and the fixed region is positioned at a user's mouth who is wearing the worn device.

8. The method of claim 1, wherein extracting the sound and the sound field comprises estimating a distance from the capture device to a sensed sound and extracting the sensed sound as the sound to which the near-field HRTFs are to be applied to in response to the distance being less than a threshold.

9. The method of claim 1, wherein extracting the sound and the sound field comprises extracting the sound from the microphone signals and subtracting the sound from the microphone signals to obtain the sound field.

10. The method of claim 1, wherein the spatial audio corresponds to a visual work as part of an audiovisual work.

11. The method of claim 1, wherein the sound and the sound field are stored electronically or transmitted to a second device, as separate signals, prior to combining.

12. A device comprising:

a plurality of microphones, and a processor, configured to:

extract a sound and a sound field from microphone signals of the plurality of microphones;

adjust a strength of the sound based on of a strength of the sound field;

apply near-field head related transfer functions (HRTFs) to the sound to produce a near-field applied sound;

apply far-field HRTFs to the sound field to produce a far-field applied sound field; and combine the near-field applied sound with the far-field applied sound field to generate spatial audio for playback through a plurality of speakers.

13. The device of claim 12, wherein applying the near-field HRTFs to the sound repositions the near-field applied sound during the playback.

14. The device of claim 13, wherein the near-field applied sound is repositioned to be centered near-field in front of a listener during the playback.

15. The device of claim 13, wherein the near-field applied sound is repositioned according to a user input or a configurable setting that indicates a desired virtual position of the near-field applied sound during the playback.

16. The device of claim 12, wherein extracting the sound includes processing the microphone signals to sense sound at a fixed region relative to the device as the sound to which the near-field HRTFs are to be applied to.

17. The device of claim 16, wherein the device comprises a handheld device that includes a camera, wherein the fixed region is behind and a direction that the camera is pointed towards.

18. The device of claim 17, wherein the device comprises a worn device and the fixed region is positioned at a user's mouth.

19. The device of claim 12, wherein extracting the sound and the sound field comprises estimating a distance from the device to the sound and extracting the sound as the sound to which the near-field HRTFs are to be applied to in response to the distance being less than a threshold.

20. The device of claim 12, wherein extracting the sound and the sound field comprises extracting the sound from the microphone signals and subtracting the sound from the microphone signals to obtain the sound field.

* * * * *